United States Patent Office 3,547,516
Patented Dec. 15, 1970

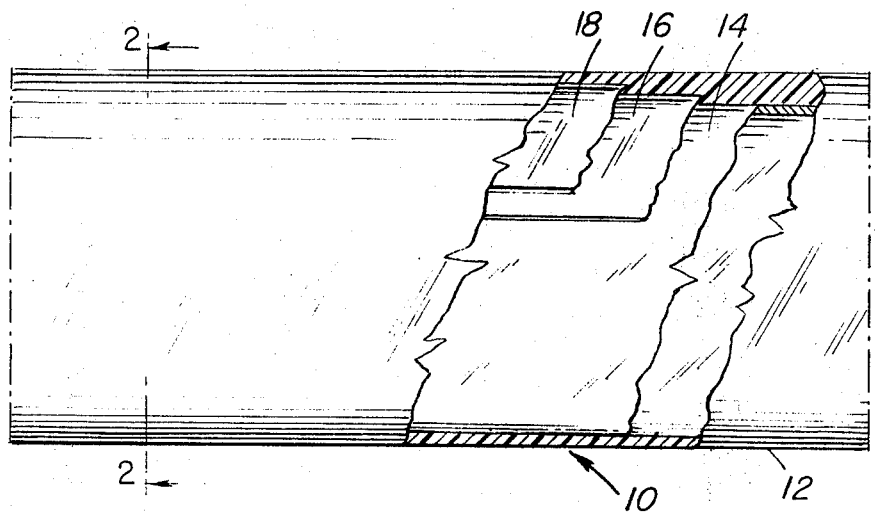
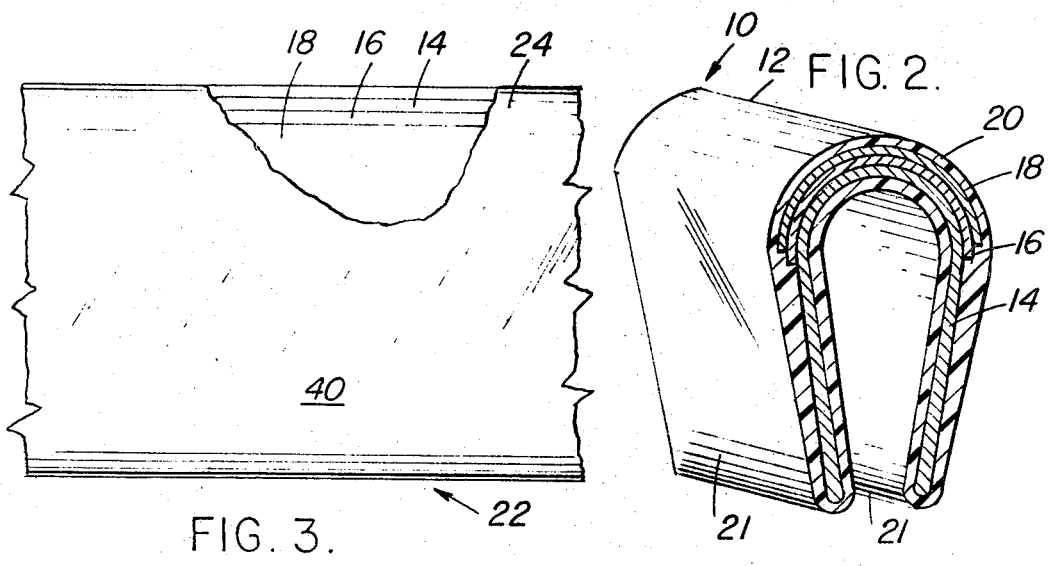
INVENTORS
VICTOR SHANOK and
JESSE P. SHANOK
Attorneys

3,547,516
COLORED LIGHT REFLECTIVE
COMPOSITE MOLDING
Victor Shanok and Jesse P. Shanok, Brooklyn, N.Y., assignors to Glass Laboratories Company, Brooklyn, N.Y., a limited partnership of New York
Continuation-in-part of application Ser. No. 793,828, Jan. 24, 1969, which is a continuation-in-part of application Ser. No. 762,739, Sept. 26, 1968. This application May 19, 1969, Ser. No. 825,887
Int. Cl. G02b 5/12; E04c 2/38; B06b 7/00
U.S. Cl. 350—97                        7 Claims

ABSTRACT OF THE DISCLOSURE

An improved colored light reflective composite molding comprising a strip of metallic foil, a strip of transparent colored material, a strip of light reflective material intermediate said strips of metallic foil and transparent colored material, said strips being encapsulated within a shell of transparent thermoplastic material.

CROSS-REFERENCE TO RELATED APPLICATIONS

This application is a continuation-in-part of our copending United States application Serial No. 793,828, filed Jan. 24, 1969, which is in turn a continuation-in-part of our copending United States application Serial No. 762,739, filed Sept. 26, 1968.

BACKGROUND OF THE INVENTION

Field of the invention

This invention relates generally to a trim strip assembly and more particularly to a trim strip assembly which is adapted to provide improved colored light reflective means.

Description of the prior art

It is often highly desirable to provide a trim strip assembly which provides not only a decorative appearance but provides also additional visual impact to the viewer. Such trim strips are described in our said copending applications.

SUMMARY OF THE INVENTION

It is, therefore, among one of the principal objectives of this invention to provide an improved colored light reflective composite which is simultaneously aesthetically pleasing and functionally useful.

In accordance with the present invention there has now been provided an improved colored light reflective composite molding comprising a strip of metallic foil, a strip of transparent colored material, a strip of light reflective material intermediate said strips of metallic foil and transparent colored material, said strips being encapsulated within a shell of transparent thermoplastic material. It has been found, surprisingly, that placing the strip of light reflective material between the metallic foil and transparent colored material causes the color of the colored material to become brightly sharpened in intensity.

BRIEF DESCRIPTION OF THE DRAWING

The invention will be hereinafter more fully described with reference to the accompanying drawing in which:

FIG. 1 illustrates a molding strip, in arcuate elongated form, made pursuant to the present invention, with the strip partially cut-away.

FIG. 2 is a sectional view in perspective taken along line 2—2 of FIG. 1.

FIG. 3 illustrates a molding strip, in elongated form, made pursuant to the invention, and shown fragmented and partially cut-away.

DESCRIPTION OF THE SPECIFIC EMBODIMENTS

Referring now to the figures of the drawing, in detail, and specifically to FIGS. 1 and 2, there is shown a composite molding 10, in this instance a generally arcuate shaped elongated body 12 of thermoplastic material in which is encased a strip of metallic foil 14, a strip of light reflective material 16, and a strip of transparent colored material 18. More specifically, the generally arcuate shaped body 12 has a curved top portion 20 with opposing inwardly merging side walls 21. In accordance with the invention, the strip of light reflective material 16 is disposed intermediate said strip of metallic foil 14 and said strip of transparent colored material 18. The effect of this intermediate disposition is to sharply brighten the hue of the particular color of the colored strip 18 disposed thereover. For example, if the strip 18 has an ordinary red color, when viewed over the reflector strip 16 it becomes a bright red; ordinary green becomes bright green; ordinary blue becomes bright blue; ordinary yellow becomes bright yellow, and so forth. Similarly, if the strip is a bright red it becomes a brighter red, and so forth. Thus, not only is the molding particularly pleasing to the eye, but because of the brighter hue of the color reflected back, it can serve to draw attention to that which the molding is attached, e.g., highway signs, advertising signs, edge trim for automobiles, etc.

The thermoplastic material forming the body 12 is a synthetic resin such as vinyl chloride or cellulose acetate butyrate, while the metallic foil 14 encased therein is usually aluminum foil. The strip of light reflective material 16 is any one of those commercially available in which light impinged thereon will be reflected back to the viewer. The strip of transparent colored material 18 may be preferably any suitable plastic such as cellulose acetate, or even vinyl chloride or cellulose acetate butyrate, less preferably glass. The entire composite strip is extruded conventionally such as by the methods shown in U.S. 3,245,864 and these methods need not further be described, the invention lying elsewhere.

As seen in FIGS. 1 and 2, the invention molding strip is arcuate shaped, making it particularly suitable for edge trim. In this embodiment, the strip of light reflective material 16 and transparent color material 18 is provided only in the curved portion 20 of the body 12 since this is the portion of the molding that will be seen directly by the viewer, while for strength the foil 14 is provided throughout. It is to be understood that the strips 16 and 18 could completely overlie the foil as well.

For example, in the embodiment shown in FIG. 3, the molding 22 comprises an elongated essentially flat body 24, with the strips 14, 16 and 18 embedded therein, as before, except that now the reflective strip 16 and the colored strip 18 substantially overlie all of the metal foil strip 14.

Strip 16 of light reflective material, as mentioned, is disposed in superposed position along the strip of metal foil 14 in a manner such that both strips 14 and 16 are visible to the viewer looking through the surface 40. In turn, strip of colored material 18 is disposed in superposed position along the strip 16. Preferably, the strip 16 is formed of a light reflective material which reflects clear or white light since this has been found to yield the best results. By providing a reflective material which reflects a color such as red, particularly interesting hues can be achieved by varying the colors of the colored strip 18. However, it has been found that the percent of colored light reflected back by the clear light reflective material is greatly increased over that reflected back by the colored light reflective material.

Thus, there has been provided by the present invention a composite molding which is not only decorative but functionally useful as well, by virtue of its additional eye-arresting visual impact.

What is claimed is:

1. A colored light reflective composite molding comprising a strip of metallic foil, a strip of transparent colored material, a strip of light reflective material intermediate said strips of metallic foil and transparent colored material, said strips being encapsulated within a shell of transparent thermoplastic material.

2. A molding according to claim 1 wherein said shell of transparent thermoplastic material further comprises an elongated arcuate shaped body.

3. A molding according to claim 1 wherein said shell of transparent thermoplastic material further comprises an elongated flat body.

4. A molding according to claim 1 wherein said strip of light reflective material is colored light reflecting.

5. A colored light reflective composite molding comprising a strip of metallic foil, a strip of transparent colored material, a strip of light reflective material intermediate said strips of metallic foil and transparent colored material, said strips being encapsulated within a shell of transparent thermoplastic material, said strip of light reflective material being of the clear reflective type so that when said molding is exposed to a source of light the color of said strip of transparent colored material will effect a brighter hue.

6. A molding according to claim 5 wherein said shell further comprises a generally arcuate shaped body having a curved top portion and opposing inwardly directed side walls, said strips of light reflective material and transparent colored material being provided only at the curved portion of said arcuate shaped body.

7. A molding according to claim 5 wherein said shell further comprises an elongated flat body.

References Cited
UNITED STATES PATENTS

| | | | |
|---|---|---|---|
| 2,928,201 | 3/1960 | Shanok et al. | 52—716 UX |
| 3,138,834 | 6/1964 | Shanok et al. | 52—716UX |
| 2,049,367 | 7/1936 | Gerber | 350—97 |
| 2,216,576 | 10/1940 | Sinsabaugh | 350—97 |
| 3,017,713 | 1/1962 | Butler | 350—97X |
| 3,152,950 | 10/1964 | Palnquist et al. | 293—54DUX |
| 3,371,447 | 3/1968 | Ruff et al. | 293—54DUX |

PAUL R. GILLIAM, Primary Examiner

U.S. Cl. X.R.

49—462; 52—716; 293—69